United States Patent [19]

Takao et al.

[11] Patent Number: 4,855,159

[45] Date of Patent: Aug. 8, 1989

[54] PROCESSED SOYBEAN FOODS AND METHOD FOR PREPARING THE SAME

[75] Inventors: Shoji Takao; Hiroshi Nakashima; Mako Tokumoto, all of Yamanashi; Makoto Saitoh, Aichi; Makoto Watanabe, Yamanashi, all of Japan

[73] Assignee: Terumo Kabushiki Kaisha, Tokyo, Japan

[21] Appl. No.: 228,179

[22] Filed: Aug. 4, 1988

Related U.S. Application Data

[63] Continuation-in-part of Ser. No. 6,788, Jan. 27, 1987.

[30] Foreign Application Priority Data

Jan. 27, 1986 [JP] Japan ................................ 13681/86
Jan. 27, 1987 [AU] Australia ............................ 68088/87
Jan. 27, 1987 [EP] European Pat. Off. ........ 8740078.7
Jan. 27, 1987 [KR] Rep. of Korea .................... 636/1987

[51] Int. Cl.⁴ ............................................. A23L 1/211
[52] U.S. Cl. .................................... 426/656; 426/425; 426/634; 426/431; 426/481; 426/331; 426/598; 426/507; 426/44; 426/46
[58] Field of Search ................. 426/44, 46, 634, 431, 426/629, 425, 481, 331, 598, 507, 656

[56] References Cited

U.S. PATENT DOCUMENTS

| | | | |
|---|---|---|---|
| 3,168,406 | 2/1965 | Moshy | 426/656 |
| 3,876,807 | 4/1975 | Wagner | 426/46 |
| 3,925,569 | 12/1975 | Daftary | 426/634 |
| 3,950,544 | 4/1976 | Fridman | 426/583 |
| 3,971,856 | 7/1976 | Daftary | 426/431 |
| 4,147,810 | 4/1979 | Kellor | 426/656 |
| 4,315,034 | 2/1982 | Levinson | 426/431 |
| 4,318,933 | 3/1982 | Miller | 426/634 |
| 4,601,910 | 7/1986 | Saub | 426/634 |

OTHER PUBLICATIONS

Patents Absts. of Japan vol. 9 No. 17 (C-262) [1740], Jan. 24, 1985.

*Primary Examiner*—Jeanette Hunter
*Attorney, Agent, or Firm*—Burns, Doane, Swecker & Mathis

[57] ABSTRACT

The present application is directed to a process for producing a processed soybean food having a phosphorus and potassium content reduced by 30% or more. The process comprises heating 1 part by weight of soybean at 70°–150° C. for 1 to 60 minutes in the presence of water, soaking the heated soybean in 5–100 parts by weight of water at a pH of 3 to 6.5 and a temperature of 10°–80° C. for 5 to 36 hours, separating the soybean from the soaking liquor and washing the separated soybean with 1–100 parts by weight of water at a pH of 5 to 9 and a temperature of 10°–80° C. for 10 minutes to 3 hours.

6 Claims, No Drawings

PROCESSED SOYBEAN FOODS AND METHOD FOR PREPARING THE SAME

The present invention is a continuation-in-part of U.S. Ser. No. 006,788, filed Jan. 27, 1987.

BACKGROUND OF THE INVENTION

1. Field of the Invention

The present invention relates to novel processed soybean foods and a method for preparing the same. More particularly, it is concerned with processed soybean foods with reduced phosphorus and potassium, and a method for preparing the same.

Further, it is concerned with starting soybean for said foods and a process for preparing the same.

The foods of the invention are rich in proteins of good quality while containing much decreased levels of phosphorus and potassium as compared with conventional processed soybean products so that it is particularly suitable for use in alimentotherapy for renal diseases.

2. Description of Prior Art

It is traditionally emphasized in alimento-therapy for renal diseases that amounts of food components such as proteins and minerals taken be controlled depending upon the patient's condition. Recently, it has been demonstrated that many patients with renal insufficiencies suffer from complications such as osteodystrophia and hyperlipemia, and development of diets for renal diseases that are capable of preventing or improving such complications is desirable. Soybean is known to possess antihyperlipemic activities because it is rich in vegetable protein and edible fibers of good quality and further it contains unsaturated fatty acids. Soybean is therefore suitable for alimentotherapy for renal diseases. On the other hand, soybean contains potassium as high as ca. 2,000 mg and phosphorus as high as ca. 600 mg per 100 g of the edible portion. In patients with renal diseases, serum potassium level increases due to their insufficient potassium excretion, which is occasionally accompanied by dyspnea and paresthesia in extremities, and in the worst cases, heart arrest. Serum phosphorus level also increases in such patients under the similar condition of potassium, and causes disorders of calcium metabolism such as osteodystrophia. In prior art processed soybean foods, which are prepared by using ordinary soybean, satisfactory reduction in phosphorus and potassium levels has not resulted.

Therefore, processed soybean foods could become a more desirable diet for renal diseases by using the soybean with a selectively decreased phosphorus and potassium content.

Phosphorus in soybean is contained in the form of phytin in a portion of ca. 75% and of phospholipid in a portion of ca. 13%. When soybean is defatted, a part of the phospholipid is separated together with the oil and fat components, but the phytin-form phosphorus and potassium remains together with water-soluble components such as proteins in the defatted soybean. Phytin is considered to be an antinutritional substance which inhibits absorption of calcium and others derived from food, and a number of methods have heretofore been developed for decreasing the phytin content of soybean. However, the prior art methods are not aimed at decreasing the content of the phosphorus itself nor made in consideration of the potassium content. For example, in Japanese Patent Public Laid Open No. 166049/1984 a method is described in which phytin is removed by hydrolyzing the phytin (phytic acid) to form inositol and phosphoric acid. The content of phosphorus itself is not decreased by this method. There is described in Japanese Patent Public Laid Open No. 7300/1974 a method of separating phytin by such means as using an ultrafiltration membrane from soybean which has been pulverized in an aqueous solution. As phytin in solution is apt to be adsorbed on protein, efficient removal of the phytin in solution by this method is difficult, and operations of the method are also complicated.

As a result of extensive studies to develop a method of efficiently removing the phosphorus and potassium components from soybean by simple procedures, we have found that, by merely soaking soybean in an aqueous solution at pH 3.0–6.5, the phytin in soybean is hydrolyzed to inositol and phosphoric acid, the phosphoric acid is eluted into the aqueous solution and the potassium component in soybean is simultaneously eluted thereby producing processed soybean with the two components decreased.

SUMMARY OF THE INVENTION

According to the present invention, there are provided processed soybean foods and methods for preparing the same, as well as the starting soybean for said foods and methods for preparing the same as follows:

(1) Processed soybean foods containing 11 mg or below of phosphorus and 40 mg or below of potassium per g of protein and methods for preparing the same;

(2) Processed soybean foods which are soybean milk, puffed foods, premixes, compositions for preparing gelled foods, bean-curd premix, gelled foods, bean curd or pudding and methods for preparing the same;

(3) Treated soybean with phosphorus and potassium levels in the starting soybean respectively reduced by 30% or more;

(4) Treated soybean according to (3) above with phosphorus and potassium levels in the starting soybean respectively reduced by 50% or more;

(5) Treated soybean according to (3) above with phosphorus and potassium levels in the starting soybean respectively reduced by 70% rr more;

(6) Treated soybean according to (3) above with phosphorus and potassium contents respectively reduced to 11 mg or below and 40 mg or below per g of protein in the soybean;

(7) Treated soybean according to (3) or (6) above wherein the starting soybean is defatted soybean;

(8) Method for preparing treated soybean which comprises soaking soybean in an aqueous solution at a pH of 3.0–6.5 to elute phosphorus and potassium components in the soybean into said aqueous solution thereby reducing the content of phosphorus and potassium in the soybean respectively by 30% or more;

(9) Method for preparing treated soybean which comprises soaking soybean in an aqueous solution at a pH of 3.0–6.5 and a temperature of 10°–80° C., separating the soybean from the soaking solution and washing the separated soybean with water at a pH of 5.0–9.0, thereby reducing the content of phosphorus and potassium in the soybean respectively by 30% or more;

(10) Method for preparing treated soybean according to (9) above which comprises soaking soybean in an aqueous solution at a pH of 3.5–6.0 and a temperature of 20°–70° C., separating the soybean from the soaking solution and washing the separated soybean with water at a pH of 6.0–8.0; and

(11) Method for preparing treated soybean according to (9) or (10) above wherein the soybean is defatted soybean.

DETAILED DESCRIPTION OF THE INVENTION

Processed soybean foods as used in the present invention mean foods produced from soybean as the raw material by subjecting it to conventional processing means for the preparation of foods, that is, foods prepared by subjecting soybean as needed, to such means as pulverization, mixing, steam cooking, boiling, baking, compressed filtration and fermentation. The foods with fillers, stabilizers, modifiers, flavors and spices known per se added to such an extent that the addition represents no deviation from the objects of the invention are included.

As described above, the foods of the invention substantially use soybean as the raw material which is rich in nutritional components. It is rich in proteins of high quality amino acid compositions and contains many lipids, carbohydrates, and minerals such as calcium and iron. As described above, the foods of the invention are characterized by a reduced content of phosphorus and potassium respectively to 11 mg or below and 40 mg or below per g of protein. Such foods are prepared from treated soybean with a reduced content of phosphorus and potassium.

As compared with natural soybean, the treated soybean has a selectively reduced content of phosphorus and potassium. Phosphorus and potassium levels in the soybean are reduced respectively by 30% or more, preferably 50% or more and more preferably 70% or more.

Although the phosphorus and potassium content of soybean is variable depending upon the quality and the place of production, soybean in general contains, per 100 g of the edible portion, ca. 600 mg of phosphorus (ca. 17 mg per g of protein) and ca. 2000 mg of potassium (ca. 57 mg per g of protein). Defatted soybean contains ca. 600 mg of phosphorus and ca. 2500 mg of potassium.

The treated soybean used in the invention, when prepared from soybean with skin, contains, per 100 g of the edible portion, ca. 420 mg or below of phosphorus (ca. 11 mg or below per g of protein) and ca. 1400 mg or below of potassium (ca. 40 mg or below per g of protein), preferably ca. 300 mg or below of phosphorus (ca. 8 mg or below per g of protein) and ca. 1000 mg or below of potassium (ca. 30 mg or below per g of protein) and more preferably ca. 180 mg or below of phosphorus (ca. 5 mg or below per g of protein) and ca. 600 mg or below of potassium (ca. 20 mg or below per g of protein).

Whereas the above-described treated soybean contains reduced phosphorus and potassium as mentioned above, other useful components such as protein, lipid, calcium, iron and vitamins are maintained.

Such treated soybean is prepared by soaking soybean in an aqueous solution at a pH of 3.0–6.5 to elute the phosphorus and potassium components into the aqueous solution.

Soybean used in the method of the invention as the raw material may be any granular unpulverized material, and can be whole soybean, skinned soybean, or the like. Reduction of the phosphorus content by soaking is faster in skinned soybean, and therefore it is desirable that, when whole soybean is used as the raw material, the skin of the soybean is peeled off prior to the soaking or the skin is stripped off by vigorously stirring the soybean in the soaking solution to allow direct contact of the cotyledon of the soybean with the soaking solution.

When whole soybean is employed as the raw material, the lipid content of the processed soybean will be as high as about 30%. Such high fat content is associated with processability problems and stability problems such as acidification when subjected to extrusion cooking or a similar process. Therefore, if the food is to be prepared by such a process, it is desirable to employ defatted soybean as the raw material.

In the above-described processing of soybean, an aqueous solution adjusted to a pH of 3.0–6.5 is used as the soaking solution. As the pH-adjusting agent for such aqueous solution, inorganic acids or organic acids which are conventionally employed in food processing are used. Preferably employed are inorganic acids such as, for example, hydrochloric acid, sulfuric acid and nitric acid and organic acids such as, for example, formic acid, acetic acid, citric acid, lactic acid, adipic acid, malic acid, ascorbic acid and succinic acid.

The most important matter in the method is the selection of the soaking conditions so as to reduce the content of the phosphorus and potassium without losing the useful components of the soybean such as protein and lipid. Whereas ca. 75% of the phosphorus in soybean is in the form of phytic acid, it is known that phytic acid is hydrolyzed by an enzyme called phytase also naturally occurring in soybean to form inositol and phosphoric acid. Whereas phytic acid is hardly separated from other components of soybean as it is readily adsorbed to protein, the phosphoric acid produced by the hydrolysis of phytic acid is relatively readily eluted into the soaking solution as is the potassium. Therefore, it is believed that the conditions of the solution participating in the manifestation of the phytase activity, particularly the pH and temperature of the soaking solution, are factors upon which efficiency of removing phosphorus is dependent. Phosphorus and potassium contents of soybean are reduced with an increase in the soaking time when soybean is stirred in a dilute acid solution with a pH adjusted in the range between 3.0 and 6.5, preferably between 3.5 and 6.0 at a solution temperature set to be 10°–80° C., preferably 20°–70° C. The phosphorus and potassium contents can be reduced more rapidly by increasing the ratio of the amount of the soaking solution to the solid content of soybean or by exchanging the soaking solution either intermittently or continuously. The soaking time is about 5–36 hours although it is dependent upon the soaking temperature.

Since pH is gradually changed during the soaking, it is desirable to maintain the pH at a predetermined value by such means as using a pH controller.

More preferably, the above-described soybean treatment is accomplished by separating the soybean after the above-described soak treatment from the soaking solution, and washing the separated soybean with water adjusted to a pH of 5.0–9.0, preferably to a pH of 6.0–8.0. Addition of such washing step further increases the ratio of phosphorus removal especially when defatted soybean is employed as the raw material. Whereas phytase activity in soybean is higher at an acidic pH, the solubility of the phytic acid which remains undecomposed in the defatted soybean is higher at around neutral pH.

It is believed that the increase in the ratio of phosphorus removal by washing defatted soybean with water at around neutral pH is due to the dissolution of phytic acid by such treatment. With natural whole soybean, phytic acid does not readily undergo dissolution as it is adsorbed to protein. On the other hand, phytic acid in defatted soybean is readily dissociated from protein by the action of phytase. Dissolution of phytic acid from intracellular material may also be easier due to a change in the cell structure through the defatting step.

Preferably, the processed soybean having a phosphorus and potassium content reduced by 30% or more respectively is produced by heating 1 part by weight of soybean at 70°–150° C. for 1–60 min. in the presence of water, soaking the heated soybean in 5–100 parts by weight of water at a pH of 3–6.5 and a temperature of 10°–80° C. for 5–36 hours, separating the soybean from the soaking liquor and washing the separated soybean with 1–100 parts by weight of water at a pH of 5–9 and a temperature of 10°–80° C. for 10 min. to 3 hours.

More preferably, 1 part by weight of soybean which has been heated at 80°–120° C. for 5–20 min. in the presence of water is soaked in 5–100 parts by weight of water at a pH of 5.0–6.5 and a temperature of 20°–70° C. for 5–36 hours, the soybean is separated from the soaking liquor and the separated soybean is washed with 5–80 parts by weight of water at a pH of 6–8 and a temperature of 20°–70° C. for 30 min. to 2 hours.

The heating of the soybean starting material in the presence of water, prior to the soaking in water is preferably conducted with hot water or steam to enable prevention of decay of the soybean during the soaking, and to further allow inactivation of the nutrition-inhibitory substances in soybean such as peroxidases and trypsin inhibitors.

Excessive heating must be avoided, since it causes a reduced removal of phosphorus and potassium from the soybean.

The soaking and the washing can be carried out efficiently in a small vessel if carried out in several portions by water exchange.

When water-containing divalent cations such as calcium or magnesium ions or polyvalent cations are used as the soaking water, the cations possibly react with phytin in soybean to form chelates which are insoluble in water and inhibit any phytase action and obstruct the elution of phosphorus and potassium from the soybean. Accordingly, there is preferably used, as the soaking water, water from which divalent and polyvalent cations have been removed by ion-exchange technique or chelation.

After the washing step, the resulting soybean is optionally heated in the same conditions as above in order to complete the prevention of decay of the soybean and inactivation of the nutrition-inhibitory substances.

As preferred examples of the processed soybean food according to the invention are mentioned soybean milk, puffed foods such as puff cake, puff pie and snack, premixes such as cake mix and flour for Japanese deep-fat fried food and compositions for preparing gelled foods and products therefrom such as bean curd, pudding, sweet jelly of beans and jelly and compositions for preparing the same.

The foods of the invention are prepared from the soybean having reduced phosphorus and potassium content as described above according to a known process per se which is selected depending upon nature of the food. For example, production of soybean milk is easily carried out according to conventional procedures by soaking in water, pulverization, heating and removal of solid matters. In the case where the lo above-described treated soybean is stored after it is dried, it is preferable to subject it to a soaking treatment in order to effect satisfactory swelling prior to pulverization. On the other hand, if production of soybean milk is carried out immediately following the above-described treatment of the soybean, the soaking at this stage may be omitted. The pulverization is preferably wet pulverization with water added, but may be dry pulverization followed by addition of water to produce a slurry. The heating is carried out at 70°–150° C., preferably at 80°–40° C. and more preferably at 90°–130° C. and may be either prior to or following the pulverization. The heating is a step for inactivating nutrition-inhibitory factors such as enzymes and trypsin inhibitors. Without inactivation of these factors, digestion and absorption of the soybean milk will be lower. The heating can also inactivate lypoxygenase which causes grass-like smelling of the soybean milk. The removal of solid matters from the slurry is effected by centrifugal separation or filtration. The crude soybean milk thus produced is subjected to heating treatment as it is or subjected to homogenization by means of a homogenizer and filled in vessels to prepare a soybean milk product. To the soybean may be added saccharides, inorganic materials, oils and fats, thickeners, fruit juices, flavors and the like so far as the addition represents no deviation from the objects of the invention.

Puffed foods are easily prepared according to conventional procedures from the above-described treated soybean after pulverization by the addition of known puffing materials, and puffing while adding water in an amount sufficient for kneading and drying. The pulverization is preferably dry pulverization, and the particle size may be selected appropriately depending upon the puffing method. To the pulverized material are added starch, reinforcing materials such as cellulose, seasonings, foaming agents as the puffing material such as sodium bicarbonate and the like to such an extent that such addition represents no deviation from the objects of the invention, followed by kneading by means of an extruder or the like, pressurizing, heating and then puffing under reduced pressure. The puffed material is baked by means of an oven or the like and dried.

Soybean which contains oligosaccharides, medium and low molecular weight saccharides such as oligosugars and raffinose becomes brown-colored if it is subjected to a pressure of 36–50 kg and a temperature of 150°–160° C. in an extruder due to the Maillard reaction between saccharides and amino acids. The treated soybean used in the invention, however, hardly undergoes the brown-coloring reaction, because oligosaccharides have been removed simultaneously with phosphorus and potassium.

Premixes such as a cake mix are prepared by pulverizing the above-described treated soybean in a dry process, followed by addition of puffing materials such as starch and reinforcing materials, for example, crystalline cellulose and swelling agents, and blending the mixture. In view of the objectives of the invention, a material containing no substantial amounts of phosphorus and potassium or a mixture of two or more of such substance are used as the swelling agent. As examples of the swelling agent are mentioned sodium bicarbonate, ammonium and alum. Such additives as sodium chloride, flavors and spices may be added as needed to such an extent that the addition represents no deviation from the objects of the present invention.

Compositions for preparing gelled food such as bean-curd premix are prepared by subjecting the above-described treated soybean to dry pulverization followed by the addition of thickening agents and coagulants and blending the mixture. In view of the objects of the invention, a material containing no substantial amount of phosphorus and potassium or a mixture of two or more of such materials is used as the thickener or the coagulant. As examples of the thickener are mentioned alginic acid, pectin, carrageenan and agar. As the coagulants are used calcium salts such as, for example, calcium lactate. If required, fillers such as starch and spices such as powdery sesame and powdery laver may be added to such an extent that the addition represents no deviation from the objects of the invention.

A bean curd-like food is prepared by adding to the bean curd-like food premix of the invention warm water at approximately 70° C., kneading the mixture and allowing it to cool. The food may be eaten as it is or after being appropriately cooked in the same way as with ordinary bean curd.

Gelled foods such as pudding are prepared by adding to the soybean milk prepared as above thickening agents and, if required, coagulants, then stirring and placing the mixture in a mold to solidify it. In view of the objects of the invention, materials containing no substantial amounts of phosphorus and potassium are used as the thickener or the coagulant. As examples of the thickener are mentioned alginic acid, pectin, carrageenan and agar. As the coagulants are used calcium salts such as calcium citrate.

The processed soybean obtained according to the invention is preferably used in alimento-therapy in renal diseases.

Upper limits of the daily intake of phosphorus and potassium for patients with renal diseases are 800 mg and 2,000 mg, respectively, for the patients on dialysis therapy. For the patients not on dialysis therapy, they are 500 mg and 1,500 mg, respectively. These components are, however, abundant in conventional protein foods such as eggs, meat, fish, beans and milk. Intake of the protein foods as much as 70–80 g per day which is the requirement for protein (40–50 g in patients on non-dialysis therapy) would cause intake of 900 mg of phosphorus and 2,200 mg of potassium (600 mg and 1,700 mg in patients on non-dialysis therapy, respectively), which are beyond the above-mentioned limits.

Since the processed soybean of the invention contains phosphorus and potassium as low as 11 mg or below and 40 mg or below, respectively, per gram of protein, substitution of the protein food to be given to patients with renal diseases (on dialysis or non-dialysis therapy) with 5 g or more, and preferably 20 g or more of the processed food of the invention per day will improve symptoms of the renal diseases.

Examples will be given below to describe the present invention in more detail.

EXAMPLE 1

Five hundred grams of skinned soybean were washed well with water and poured into 10 lit. of citrate solution at pH 3.5. The mixture was stirred at room temperature for 24 hours in such a manner that the soybean in the soaking vessel flowed slowly. Then, the soaking solution was discarded, and the recovered soybean was heated (80° C., 30 min.) and dried under reduced pressure.

The above-described treatment provided removal of 72.7% of the phosphorus and 84.8% of the potassium in the soybean, the reduction of the content being to 194 mg from 587 mg (pre-treatment) for phosphorus and to 381 mg from 2065 mg (pre-treatment) for potassium per 100 g of dry product. Phosphorus was measured by the phosphorus-molybdate method, and potassium by the atomic absorption method. Yields of the soybean solid content and the protein were 82.4% and 90.1%, respectively.

EXAMPLE 2

Five hundred grams of skinned soybean were washed well with water and poured into 5 lit. of water. The mixture was stirred while maintaining the pH in the range between 4.5 and 6.0 by addition of lactic acid as needed and the solution temperature at 50° C. The soaking solution was discarded 6 hours after initiation of the soaking, followed by addition of 5 lit. of fresh water and adjustment of the pH with lactic acid to 5.5. Soaking was then made at 50° C. for 18 hours. Then, the soybean was recovered, heated (120° C., 10 min.) and dried under reduced pressure.

The treatment provided removal of 76.1% of the phosphorus and 88.0% of the potassium in the soybean, reduction of the content being to 179 mg for phosphorus and to 314 mg for potassium per 100 g of dry product. Yields of the soybean solid content and the protein being 78.6% and 85.6%, respectively.

EXAMPLE 3

One kilogram of skinned soybean was poured into 4 lit. of water. The mixture was maintained at a pH of 5.5 by the addition of acetic acid as needed using a pH controller and at a solution temperature of 50° C. The mixture was stirred at room temperature for 24 hours while continuously introducing warm water at 50° C. at a flow rate of 2 lit./hr. and discharging an equal amount of the soaking solution to maintain the soaking solution at a level of 5 lit.

After completion of the soaking treatment, the soybean was recovered, heated (120° C., 10 min.) and dried under reduced pressure.

The above treatment provided removal of 83.6% of the phosphorus and 99.9% of the potassium in the soybean, reduction of contents being to 133 mg for phosphorus and to 2.5 mg for potassium per 100 g of dry product. Yields of the soybean solid content and the protein were 72.0% and 75.9%, respectively.

EXAMPLE 4

In 200 ml of water was soaked 10 g of defatted soybean with stirring, while maintaining the soaking solution at a temperature of 50° C. and a pH of 5.5 by addition of acetic acid as needed. Six hours after initiation of the soaking, the soaking solution was discarded, 100 ml of fresh water was added and the mixture was stirred at room temperature for 30 min. to effect washing. The washing was discarded, and another washing treatment was made in the same way as above, followed by recovery of the soybean. The soybean was heated at 120° C. for 10 min. and then dried under reduced pressure.

Similar procedures were carried out with the soaking period of time and the frequency of washing changed.

Measurements were then made on removal ratios of phosphorus, potassium and protein contained in the treated soybean. Results are shown in Table 1.

TABLE 1

| | Removal ratios of phosphorus, potassium and protein (%)* | | | | | | | |
|---|---|---|---|---|---|---|---|---|
| | 2-hour soaking | | | 4-hour soaking | | | 6-hour soaking | | |
| | P | K | N | P | K | N | P | K | N |
| Before washing | 59.7 | 71.9 | 14.9 | 61.9 | 74.2 | 15.8 | 60.2 | 76.9 | 19.2 |
| | (7.38) | (16.30) | | (6.54) | (13.36) | | (5.94) | (11.63) | |
| After one-time washing | 72.2 | 83.3 | 17.1 | 73.9 | 86.6 | 18.0 | 78.4 | 89.7 | 22.4 |
| | (5.23) | (9.95) | | (4.60) | (7.12) | | (4.40) | (5.43) | |
| After two-time washings | 78.5 | 87.9 | 17.9 | 80.2 | 91.7 | 18.9 | 84.5 | 94.3 | 23.5 |
| | (4.09) | (7.25) | | (3.52) | (4.44) | | (3.21) | (3.09) | |

*Cumulative removal ratio shown
Figure in the parentheses indicates content of P or K (mg) per g of protein
P: Phosphorus
K: Potassium
N: Protein It is clearly seen from Table 1 that the 2-hour soaking treatment results in removal of ca. 60% of the phosphorus, almost no improvement of the removal ratio resulted even if the soaking period of time was prolonged to 6 hours, but two-time washing treatments increases the removal ratio by ca. 20%. Removal ratio of potassium is increased with an increase in the soaking period time or the frequency of washing.

EXAMPLE 5

Into 20 lit. of water was poured 1 kg of defatted soybean. The mixture was stirred while maintaining the pH in the range between 5.0 and 6.0 by the addition of acetic acid as needed and the temperature at 50° C. Three hours after initiation of the soaking, the soaking solution was discarded, and 10 lit. of fresh water was added. The mixture was stirred at room temperature for 30 min. to effect washing. The washing was discarded, and the washing treatment was repeated twice (3 times in total) followed by recovery of the soybean. The soybean was heated at 120° C. for 10 min. and then dried under reduced pressure. Removal ratios of phosphorus and potassium in the treated soybean thus obtained were 90.7% and 96.0%, respectively. The contents per 100 g of the edible matter (on dry basis) were 156 mg for phosphorus and 134 mg for potassium. The contents per g of protein were 2.88 mg for phosphorus and 2.48 mg for potassium. On the other hand, yields were 60.1% for soybean solid content and 70.4% for protein.

EXAMPLE 6

Preparation of soybean milk

To 10 kg of the treated soybean produced by the method described in Example 3 (without heat drying treatment) was added 50 lit. of hot water followed by wet pulverization. The slurry thus obtained was neutralized by the addition of calcium hydroxide as needed, and insoluble matter (bean-curd refuse) was separated by filtration by means of filter clothes to give 30 lit. of homogenized soybean milk. Solid content of the soybean milk thus obtained was 11%, and the pH of the soybean milk was 7.4. The content per 100 g of the solid content was 171 mg for phosphorus, 288 mg for potassium and 35.9 g for protein. The content per g of protein was 4.8 mg of phosphorus and 8 mg of potassium. In 86.8 g of the soybean milk were dissolved 9 g of sucrose, 2.5 g of vegetable oil, 0.25 g of calcium carbonate and 1.5 g of coffee-like flavor to give a soybean milk drink having a very good taste.

EXAMPLE 7

Preparation of puffed food

To 400 g of the treated soybean produced in Example 5 which had been dry pulverized was added 500 g of wheat starch and 100 g of corn fibers. The mixture was subjected to puffing treatment by means of a two-axis extruder while adding water as needed. During the operation, the material in treatment was encountered with a pressure of 35 kg/cm$^2$ and a temperature of 165° C. The content of phosphorus and potassium in the puffed soybean food thus produced was 4.5 mg and 3 mg, respectively, per g of protein.

EXAMPLE 8

Preparation of cake mix

To 210 g of the treated soybean produced by the method described in Example 4 which had been dry pulverized were added 550 g of wheat flour, 20 g of sodium bicarbonate, 200 g of sugar and 20 g of almond powder to prepare a cake mix. The cake mix thus obtained contained 5 mg of phosphorus and 12 mg of potassium per g of protein. To 60 g of the cake mix was added 50 g of water, and the mixture was baked in a conventional way to obtain a hot cake having a very good taste.

EXAMPLE 9

Preparation of bean-curd premix

To 500 g of the treated soybean produced by the method described in Example 5 which had been dry pulverized was added 775 g of a commercially available coagulant composed of 25 g of sesame powder and alginic acid and calcium salt (Duckgel C-201 manufactured by Kibun Food Chemifar) to prepare instant bean-curd premix. The bean-curd premix contained 4 mg of phosphorus and 3 mg of potassium per g of protein.

To 42 g of the above-described bean-curd premix was added 258 ml of warm water to give a homogeneous mixture. When allowed to cool, there was obtained bean curd-like food having a very good taste. The food could be used as with ordinary bean curd for cooked foods.

EXAMPLE 10

Preparation of pudding

To 890 g of the soybean milk produced in the same way as in Example 6 was added 82 g of a commercially available coagulant composed of 28 g of sugar and alginic acid and calcium salt (Duckgel C-201 manufactured by Kibun Food Chemifar). The mixture was warmed to 70° C. and stirred to give a homogeneous mixture, 100 g each of which was divided in a mold and allowed to cool. There was then obtained a pudding having a very good taste. It contained 3 mg of phosphorus and 4 mg of potassium per g of protein.

EXAMPLE 11

In 500 ml of water from which divalent and polyvalent cations had been removed by ion-exchange technique by means of an automatic water softener, Type TS-12 manufactured by Takuma K.K., was soaked 25 g of skinned soybean. The soaking mixture was stirred while adequately adding acetic acid to maintain the pH at 5.5 and the temperature at 50° C. Six hours after initiation of the soaking, the soaking liquor was discarded and 500 ml of water freshly prepared as above was added. The pH was adjusted with acetic acid to 5.5 and the soaking was conducted at 50° C. for 6 hours. The soaking mixture was treated in the same way as above, and soaking was undertaken for an additional 12 hours.

The soybean was then recovered, heated at 120° C. for 10 min. and dried under reduced pressure.

Removal ratios of phosphorus, potassium and protein in the soybean thus obtained were measured. Results are shown in Table 2.

EXAMPLE 12

The same procedures as in Example 11 were carried out except that as the water was employed tap water with sodium citrate as a chelating agent in concentration of 0.05% added.

Results of the measurement in percent removal for phosphorus, potassium and protein in the soybean thus obtained are shown in Table 2.

COMPARATIVE EXAMPLE 1

The same procedures as in Example 11 were carried out except that the water used was tap water which contained divalent and polyvalent cations. The results are shown in Table 2.

TABLE 2

| Removal ratios of phosphorus, potassium and protein (%) | | | |
|---|---|---|---|
|  | Example 11 by ion exchange technique | Example 12 using a chelating agent | Comparative Example 1 tap water |
| Phosphorus | 86.2 | 82.7 | 73.7 |
|  | (2.49) | (3.30) | (4.88) |
| Potassium | 99.6 | 98.9 | 99.4 |
|  | (0.23) | (0.67) | (0.34) |
| Protein | 12.6 | 17.2 | 14.6 |

*The figure in parentheses represents phosphorus or potassium content (mg) per g of protein.

EXAMPLE 13

In 500 ml of soft water was soaked 25 g of defatted soybean. To the soaking mixture was added sodium citrate to a concentration of 0.03% and the pH of the soaking mixture was adjusted with sodium hydroxide to 8.0. The resulting mass was stirred while maintaining the temperature at 60° C. Six hours after initiation of the soaking, the soaking liquor was discarded. There was then added 500 ml of fresh soft water to which sodium citrate had been added at a proportion of 0.03%, and the soaking was conducted at 60° C. for 6 hours. Then, the same liquid exchange as above was repeated, and the soaking was conducted for an additional 12 hours.

Subsequently, the soybean was recovered, heated at 120° C. for 10 min. and dried under reduced pressure.

Removal ratios of phosphorus, potassium and protein in the soybean thus obtained were 80.6%, 89.3% and 21.8%, respectively.

EXAMPLE 14

Into 5 liters of warm water was poured 1 kg of skinned soybean, and the mixture was heated at 80° C. for 20 min. The heated soybeans were then recovered, thoroughly drained off and again poured into 100 liters of water. The mixture was gently stirred at 40° C. while maintaining the pH at 5.5 by adequately adding citric acid by means of a pH controller. After an elapse of 24 hours, the liquid was discarded. To the remaining mass was added 10 liters of fresh water, and the mixture was gently stirred at 10° C. for 2 hours for washing while maintaining the pH at 7.0 by adequately adding sodium bicarbonate. The washed soybean was recovered, steam heated at 120° C. under pressure for 10 min. and dried. Removal ratios of phosphorus and potassium in the processed soybeans thus obtained were 86% and 96%, respectively. The content per 100 g of the edible matter (on dry basis) were 123 mg for phosphorus and 124 mg for potassium. The content per g of protein was 3.8 mg for phosphorus and 3.8 mg for potassium. Yields were 65% for solid soybean and 75% for protein.

Results of the above-described operation carried out under various conditions are shown in Table 3.

TABLE 3

| Ex. No. | Starting material | Heating Prior to Soaking | Soaking | Washing | Heating after soaking | Removal ratio (%) P | Removal ratio (%) K | Content per 100 g of matters P | Content per 100 g of matters K | Content per g of protein P | Content per g of protein K | Yield (%) Solid soybean | Yield (%) Protein |
|---|---|---|---|---|---|---|---|---|---|---|---|---|---|
| 15 | Skinned soybean 1 kg | 80° C. 20 min. | Water 100 l. pH 5.5 20° C. 9 hrs. | Water 10 l. pH 7.0 10° C. 2 hrs. | Under pressure 120° C. 10 min. | 60 | 74 | 314 | 723 | 9.5 | 21.8 | 75 | 77 |
| 16 | (as above) | (as above) | Water 100 l. pH 6.5 | (as above) | (as above) | 60 | 81 | 323 | 537 | 9.2 | 15.2 | 73 | 82 |

TABLE 3-continued

| Ex. No. | Starting material | Heating Prior to Soaking | Soaking | Washing | Heating after soaking | Removal ratio (%) P | Removal ratio (%) K | Content per 100 g of matters P | Content per 100 g of matters K | Content per g of protein P | Content per g of protein K | Yield (%) Solid soybean | Yield (%) Protein |
|---|---|---|---|---|---|---|---|---|---|---|---|---|---|
| 17 | (as above) | (as above) | 40° C. Water 20 l. pH 5.0 50° C. 3 hrs. (operated 3 times) | (as above) | (as above) | 62 | 98 | 305 | 62 | 8.3 | 1.7 | 73 | 85 |
| 18 | Skinned soybean 1 kg | 80° C. 20 min. | Water 20 l. pH 5.5 5° C. 3 hrs. (operated 3 times) | Water 10 l. pH 7.0 10° C. 2 hrs. | Under pressure 120° C. 10 min. | 69 | 98 | 247 | 59 | 7.2 | 1.7 | 73 | 80 |
| 19 | (as above) | 120° C. 5 min. | Water 20 l. pH 5.5 70° C. 3 hrs. (operated 3 times) | Ion-exchanged water 20 l. pH 6.5–7 50° C. 1 hr. | None | 85 | 97 | 117 | 104 | 3.5 | 3.1 | 69 | 78 |
| Control | (as above) | (as above) | None | (as above) | 120° C. 20 min. | 22 | 21 | 490 | 1749 | 12.0 | 42.8 | 93 | 95 |
| 20 | Defatted Soybean | 80° C. 30 min. | Water 20 l. pH 6.0 50° C. 2 hrs. (operated 3 times) | Ion-exchanged water 20 l. pH 6.5–7 50° C. 1 hr. | 120° C. 20 min. | 91 | 99 | 108 | 42 | 3.4 | 1.3 | 63 | 70 |
| 21 | (as above) | None | (as above) | (as above) | (as above) | 90 | 99 | 121 | 50 | 3.8 | 1.6 | 62 | 69 |
| 22 | (as above) | 80° C. 30 min. | (as above) | None | (as above) | 89 | 98 | 130 | 62 | 4.0 | 1.9 | 63 | 70 |

TEST EXAMPLE 1

Wistar male rats of 4 weeks old were subjected to 5/6 kidney excision and fed on ordinary feed for 2 weeks to prepare kidney disease-model rats. Three groups of the model rats each consisting of 5 animals were fed on the feed shown in Table 4 for 6 weeks while incomings and outgoings of phosphorus and calcium were observed. Then, the rats were sacrificed. Phosphorus, potassium and calcium in the blood were measured and the kidney and bone tissues were microscopically observed. The results were summarized in Table 5. In the high phosphorus-fed group (25 mg/g protein), phosphorus in the blood was increased, and calcium in the blood decreased. There was also observed progress of impairment in the findings for the kidneys and the bones. In the low phosphorus-fed group (11 mg/g protein), on the other hand, phosphorus concentration in blood tends to be lower, and the calcium concentration tends to be higher, and almost no abnormalities were observed in the kidneys and the bones. However, in the low phosphorus- and high potassium-fed group, potassium in blood was significantly higher, and slight changes were observed in the kidneys. The above results suggest that the food of the present invention is useful in alimentotherapy for renal diseases.

TABLE 4

| Feed | n | Protein Source | Protein content (%) | Phosphorus content (%) | Potassium content (%) |
|---|---|---|---|---|---|
| A | 5 | Soybean | 15 | 0.40 | 0.60 |
| B | 5 | Soybean | 15 | 0.17 | 0.60 |

TABLE 4-continued

| Feed | n | Protein Source | Protein content (%) | Phosphorus content (%) | Potassium content (%) |
|---|---|---|---|---|---|
| C | 5 | Soybean | 15 | 0.17 | 0.30 |

A: Feed containing phosphorus and potassium on ordinary level
B: Low-phosphorus feed
C: Low-phosphorus, low-potassium feed

TABLE 5

| Feed | n | Phosphorus in blood | Potassium in blood | Calcium in blood | Abnormal Finding Kidney | Abnormal Finding Femur |
|---|---|---|---|---|---|---|
| A | 5 | 8.5 ±0.9 | 5.6 ±0.7 | 13.4 ±1.2 | ++ | ++ |
| B | 5 | 7.2 ±0.5 | 5.3 ±1.0 | 16.3 ±0.3 | ± | — |
| C | 5 | 7.0 ±0.3 | 4.0 ±0.8 | 16.5 ±0.4 | — | — |

Note:
Phosphorus in blood mg/dl, Potassium in blood mEq/l., Calcium in blood mg/dl

TEST EXAMPLE 2

Kidney-insufficient patients on conservative therapy (n=12) and patients on dialysis therapy (n=12) were given the food prepared in Example 7 in such a way that the protein constituted 30% of the whole meal.

The test meal was given successively for one week, and before and after the test meal, the usual meal for kidney insufficiency was given for one week respectively. Phosphorus and potassium concentrations in the blood were observed over the three weeks. Phosphorus intake per week was 650 mg, 500 mg and 600 mg, respectively, on average for the conservative therapy and 1,000 mg, 780 mg and 950 mg, respectively, on average for the dialysis therapy. Potassium intake per week was 2,000 mg, 1,600 mg and 2,100 mg, respectively, on average for the conservative therapy, and 2,400 mg, 2,000 mg and 2,350 mg, respectively, on average for the dialysis therapy.

On the other hand, mean phosphorus concentration in blood during each week was 5.5 mg/dl, 5.0 mg/dl and 5.0 mg/dl for the conservative therapy and 6.4 mg/dl, 5.6 mg/dl and 6.3 mg/dl for the dialysis therapy. Mean potassium concentration was 4.9 mEq/l., 4.7 mEq/l. and 5.0 mEq/l. for the conservative therapy and 5.5 mEq/l., 5.0 mEq/l. and 5.5 mEq/l. for the dialysis therapy.

The above results were believed to indicate that the foods according to the present invention were very useful for controlling phosphorus and potassium in the body of patients with kidney diseases.

TEST EXAMPLE 3

Wistar male rats of 4 weeks old were subjected to 5/6 kidney excision and fed on ordinary feed for 2 weeks to prepared kidney disease-model rats. Four groups of the model rats each consisting of 5 animals were fed on the feed shown in Table 6 for 4 weeks. Then, the rats were sacrificed. Calcium, phosphorus and potassium in blood were measured and the kidney and bone tissues were microscopically observed. The results were summarized in Table 7. In the high phosphorus-fed group (25 mg/g protein), calcium in the blood remained lower than normal value and phosphorus concentration in the blood remained higher than normal value even when the calcium content was increased to 3.0%.

In this case, abnormal findings observed in the kidneys such as calcification were more frequent than in the case of the low-calcium group. On the contrary, in the low phosphorus-fed group, at a calcium level of 3.0% blood calcium was remarkably increased to normal value and there were observed no abnormalities of the kidneys and the bone. When high-potassium feed was given, potassium in the blood was increased beyond the normal value.

The above results suggest that the phosphorus level be desirably 1.1 mg or lower per g of protein in order to provide adequate supply of calcium. It is also desirable that the potassium level be 20 mg or lower per g of protein.

TABLE 6

| | | Composition of the Feed (%) | | | |
|---|---|---|---|---|---|
| Feed | n | Protein Content | Phosphorus Content | Calcium Content | Potassium Content |
| D | 5 | 15 | 0.40 | 0.40 | 0.60 |
| E | 5 | 15 | 0.40 | 3.0 | 0.60 |
| F | 5 | 15 | 0.17 | 3.0 | 0.60 |
| G | 5 | 15 | 0.17 | 3.0 | 0.30 |

TABLE 7

| Feed | n | Calcium in blood | Phosphorus in blood | Potassium in blood | Abnormal Finding Kidney | Femur |
|---|---|---|---|---|---|---|
| D | 5 | 12.2 ±1.0 | 8.6 ±0.4 | 5.0 ±0.8 | + | + |
| E | 5 | 13.9 ±1.2 | 8.0 ±0.7 | 5.1 ±0.1 | ++ | − |
| F | 5 | 17.8 ±0.5 | 6.3 ±0.4 | 5.1 ±0.8 | − | − |
| G | 5 | 16.8 | 6.6 | 4.0 | − | − |

TABLE 7-continued

| Feed | n | Calcium in blood | Phosphorus in blood | Potassium in blood | Abnormal Finding Kidney | Femur |
|---|---|---|---|---|---|---|
| | | ±0.9 | ±0.7 | ±0.5 | | |

Note:
Calcium in blood mg/dl, Phosphorus in blood mg/dl, Potassium in blood mEq/l.

TEST EXAMPLE 4

Tests were conducted in the same way as in Test Example 3 except that the level of calcium intake was varied (phosphorus level in the sample was 0.17%) to observe the relations between the level of calcium intake and the kidney findings or the bone findings. The results are shown in Table 8.

It is suspected from these results that when the level of calcium intake is low, calcium concentration in the blood will not sufficiently be increased and bone weakening will be induced, but when the calcium level is high, calcium concentration in the blood will be increased too much, and damage such as kidney calcification will be induced. It is therefore suggested that adequate level of calcium be in the range between 25 mg and 200 mg per g of protein.

TABLE 8

| Feed | n | Protein in the feed (%) | Calcium in the feed (%) | Phosphorus in the feed (%) | Abnormal Finding Kidney | Femur |
|---|---|---|---|---|---|---|
| H | 5 | 15 | 0.20 | 0.17 | − | + |
| I | 5 | 15 | 0.38 | 0.17 | − | ± |
| J | 5 | 15 | 1.00 | 0.17 | − | − |
| K | 5 | 15 | 3.00 | 0.17 | ± | − |
| L | 5 | 15 | 5.00 | 0.17 | ++ | − |

TEST EXAMPLE 5

Soybean milk prepared form the processed soybean of Example 1 (protein 6 g, phosphorus 30 mg and potassium 10 mg) was given to patients with renal diseases every day for 3 weeks in place of cow milk (protein 6 g, phosphorus 200 mg and potassium 350 mg). Phosphorus in blood of 7.0 mg/dl prior to the start was decreased to 5.5 mg/dl. Likewise, potassium of 6.0 mEq/l. was decreased to 1.5 mEq/l. Symptoms originating from high phosphorus and potassium (joint pain and paresthesia in arms and legs) were improved.

What is claimed is:

1. A process for producing a processed soybean food having a phosphorus and potassium content reduced by 30% or more, said process comprising heating 1 part by weight of soybean at 70°–150° C. for 1 to 60 minutes in the presence of water, soaking the heated soybean in 5–100 parts by weight of water at a pH of 3 to 6.5 and a temperature of 10°–80° C. for 5 to 36 hours, separating the soybean from the soaking liquor and washing the separated soybean with 1–100 parts by weight of water at a pH of 5 to 9 and a temperature of 10°–80° C. for 10 minutes to 3 hours.

2. A process for producing a processed soybean food having a phosphorus and potassium content reduced by 30% or more, said processing comprising heating 1 part by weight of soybean at 80°–120° C. for 5 to 20 minutes in the presence of water, soaking the heated soybean in 5–100 parts by weight of water at a pH of 5.0 to 6.5 and a temperature of 20°–70° C. for 5 to 36 hours, separating the soybean from the soaking liquor and washing the separated soybean with 5–80 parts by weight of water at a pH of 6 to 8 and a temperature of 20°–70° C. for 30 minutes to 2 hours.

3. A process for producing soybean food according to claim 1 wherein the soaking of the heated soybean is conducted using water from which divalent and polyvalent cations are removed by ion-exchange technique.

4. A process according to claim 1 wherein the soybean is skinned soybean.

5. A process according to claim 1 wherein the soybean is defatted soybean.

6. The process recited in claim 1 wherein said processed soybean food is further heated at 70°–150° C. for 1 to 60 minutes in the presence of water.

* * * * *